US007957039B2

(12) United States Patent
Tatsuno

(10) Patent No.: US 7,957,039 B2
(45) Date of Patent: Jun. 7, 2011

(54) ORIGINAL-DOCUMENT ILLUMINATION APPARATUS, IMAGE READING APPARATUS, COLOR-ORIGINAL-DOCUMENT READING APPARATUS AND IMAGE FORMING APPARATUS

(75) Inventor: Hibiki Tatsuno, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 938 days.

(21) Appl. No.: 11/898,264

(22) Filed: Sep. 11, 2007

(65) Prior Publication Data
US 2008/0062478 A1    Mar. 13, 2008

(30) Foreign Application Priority Data

Sep. 13, 2006 (JP) .................................. 2006-248685

(51) Int. Cl.
*H04N 1/04* (2006.01)
(52) U.S. Cl. ......... 358/475; 358/474; 358/496; 358/497
(58) Field of Classification Search .................. 358/475, 358/474, 496, 497
See application file for complete search history.

(56) References Cited

U.S. PATENT DOCUMENTS

| 7,278,755 | B2 * | 10/2007 | Inamoto ........................ 362/240 |
| 2005/0111115 | A1 | 5/2005 | Tatsuno et al. |
| 2005/0195452 | A1 | 9/2005 | Tatsuno |
| 2006/0007417 | A1 | 1/2006 | Tatsuno |
| 2006/0044795 | A1 | 3/2006 | Tatsuno |
| 2007/0024977 | A1 | 2/2007 | Kawamura et al. |

FOREIGN PATENT DOCUMENTS

| JP | 2725650 | 12/1997 |
| JP | 11-232912 | 8/1999 |
| JP | 2004-361425 | 12/2004 |
| JP | 3659770 | 3/2005 |
| JP | 2005-278132 | 10/2005 |

* cited by examiner

*Primary Examiner* — Houshang Safaipour
(74) *Attorney, Agent, or Firm* — Dickstein Shapiro LLP

(57) ABSTRACT

An original-document illumination apparatus includes an illuminated face on which an original-document is placed. The original-document illumination apparatus also includes a light-source unit having a plurality of light-emitting elements which are arranged along the main-scanning direction of the original-document and which illuminate the original-document. The light source unit is movable in a sub-scanning direction that is orthogonal to the main-scanning direction. In addition, the original-document illumination apparatus includes a lens array disposed between the illuminated face and the light-source unit, and having a plurality of convergent lenses. A luminous flux from each of the light-emitting elements of the light-source unit is radiated onto the illuminated face through each of the lenses of the lens array.

13 Claims, 4 Drawing Sheets

ORIGINAL-DOCUMENT ILLUMINATION APPARATUS, IMAGE READING APPARATUS, COLOR-ORIGINAL-DOCUMENT READING APPARATUS AND IMAGE FORMING APPARATUS

PRIORITY CLAIM

The present application is based on and claims priority from Japanese Application Number 2006-248685, filed Sep. 13, 2006, the disclosure of which is hereby incorporated by reference herein in its entirety.

BACKGROUND OF THE INVENTION

1. Field of the Invention

The present invention relates to an original-document illumination apparatus used for digital copiers and image scanners. The invention, in particular, relates to an original-document illumination apparatus which employs a light emitting diode as a light source. The invention also relates to a color-original-document reading apparatus and an image reading apparatus which employ the original-document illumination apparatus. The invention furthermore relates to an image forming apparatus which employs the color-original-document reading apparatus and the image reading apparatus.

2. Description of Related Art

Development of light emitting diodes (LEDs) has been advanced recently, and LEDs having high brightness have been dramatically requested. LEDs, in general terms, have such advantages as longer service life, higher efficiency, higher resistance to impact, and their capability of emitting monochromatic lights. For this reason, application of LEDs to a variety of lightening purposes is expected.

Among other things, LEDs are actually used in an original-document illumination apparatus of an image reading apparatus, such as digital copiers and image scanners.

FIG. 7 schematically shows an image forming apparatus 10, which has such an image reading apparatus as described above.

The image forming apparatus 10 shown in the example of FIG. 7 includes an image forming unit 100 and an image reading apparatus which is an image reading unit 200.

The image forming unit 100 includes a drum-shaped latent image carrier 111. The latent image carrier 111 is a photoconductive photo receptor. The uniform electrostatic charging of and the laser scanning of the latent image carrier 111 form an electrostatic latent image on the surface of the latent image carrier 111. The electrostatic latent image formed on the surface of the latent image carrier 111 is turned into a visible toner image. A roller charging device 112 as electrostatic charging means, a development apparatus 113, a transfer roller 114, and a cleaning apparatus 115 are disposed around the latent image carrier 111. FIG. 7 shows an example in which the roller charging device 112 is used as electrostatic charging means, but a corona charger may replace the roller charging device 112 as the electrostatic charging means. In addition, a laser scanning apparatus 117 is disposed around the latent image carrier 111. The laser scanning apparatus 117 receive data on an original-document that an external apparatus such as an image reading unit 200 sends, and scans the original document data by a laser beam (LB). The laser scanning apparatus 117 carries out "exposure by optical writing" between the roller charging device 112 and the development apparatus 113.

At image formation, the latent image carrier 111 which is a photoconductive photoreceptor uniformly rotates clockwise, and thus the surface of the latent image carrier 111 is electrostatically charged with uniformity by the roller charging device 112. In addition, the surface of the latent image carrier 111 is subjected to an exposure by optical writing with the laser beam LB of the laser scanning apparatus 117. As a result, an electrostatic latent image is formed on the surface of the latent image carrier 111. The electrostatic latent image thus formed is what is termed as a negative latent image. The image portion formed on the surface of the latent image carrier 111 is exposed to the laser beam LB. Transfer paper P is stored in a cassette 118, which is, in turn, is attachable to and detachable from the main body of the image forming unit 100. Now, assuming that the cassette 118 is attached to the image forming unit 100 as shown in FIG. 7, the upper most sheet of a plurality of sheets of the transfer paper P stacked in the cassette 118 is fed by a feed roller 120. The sheet of the transfer paper P thus fed is sent to the transfer unit while the front end portion of the sheet is held by a pair of register rollers 119. The pair of the register rollers 119 are configured to send the sheet of the transfer paper P to the transfer unit so as to be in time for the arrival of the toner image on the toner carrier 111 at the transfer position. The sheet of the transfer paper P thus sent to the transfer unit and the toner image are laid over each other in the transfer unit. The toner image that is laid over transfer paper P, with the operation of the transfer roller 114, is electrostatically transferred to the sheet of the transfer paper P. Once the toner image is transferred to the sheet of the transfer paper P, a cleaning apparatus 115 removes the toner and the paper dusts remaining on the surface of the latent image carrier 111. The sheet of transfer paper P on which the toner image is transferred is fed to a fixing unit 116. Feeding the sheet of the transfer paper P to the fixing unit 116 makes the toner image fixed to the transfer paper P. Thereafter, the sheet of the transfer paper P passes through a feeder path 121, and is then discharged out to a tray 123 by a pair of discharge rollers 122.

The image reading unit 200 includes a contact glass 201 on which an original-document 202 is placed, and a first carriage 203 that is disposed below the contact glass 201. An illumination member (not shown) is mounted on the first carriage 203 to illuminate original-document 202 on the contact glass 201. The light reflected from the original-document 202 is then reflected at the surface of a first mirror 203a that is mounted on the first carriage 203. Thereafter, the light is reflected on, a first and a second mirrors 204a and 204b of a second carriage 204, and then is guided to a reducing, image-forming lens 206. With the guided reflected light, the reducing, image-forming lens 205 forms an image on a line sensor 206.

When the original-document is read along the longitudinal direction thereof, the first carriage 203 is moved to the right-hand side of FIG. 7 at a speed V, and, concurrently, the second carriage 204 is moved to the right-hand side at half the speed of the first carriage 203, that is, at ½ V The entire original-document can be read in this way.

Despite the above-mentioned excellent properties, a single LED cannot emit light that is luminous enough to be used in an original-document illumination apparatus 11 (see FIG. 6) of an image reading apparatus 200. Accordingly, LEDs can be used in such apparatuses as a lower-speed reading apparatus and a compact-type reading apparatus, but cannot be used in such apparatuses as a higher-speed reading apparatuses and a large-type apparatus. Consequently, mainly, cold cathode fluorescent lamps are used in higher-speed reading apparatuses and larger apparatuses.

The above-mentioned problem of LEDs is generally dealt with by use of many LEDs arranged into an array to obtain increased amount of light of the original-document illumination apparatus 11 as a whole. In this case, however, the light of each LED spreads so widely as to lessen the efficiency and to contradict the promotion of energy saving products. To counteract such problems in efficiency and energy consumption, round type LEDs, which suffers less, among a plurality of types of LEDs, from the spread of their light, may be used in original-document illumination apparatus 11 of the image reading apparatus 200. The use of round type LEDs may possibly enhance efficiency. However, the light emitted from the round type LED is irradiated in a direction at a narrow angle, so that an uneven distribution of illuminance may possibly occur in the main-scanning direction.

In an original-document illumination apparatus that has been proposed thus far, an LED array, which includes a plurality of LEDs, and a lengthy lens are combined to accomplish more efficient use of light. For example, Japanese Patent Application Laid-open Publication No. H11-232912 and Japanese Patent No. 272660 disclose such an original-document illumination apparatus. In these apparatuses, the more efficient use of light is generally pursued by making the light from LEDs converge on a cross section along the sub-scanning direction of the LEDs. Such a method, however, has a problem. As shown in a drawing of Japanese Patent Application Laid-open Publication No. H111-232912, the center portion of the convergent light is bright, but a rapid drop in brightness is observed at a position away from the center. In this method, among the light emitted from the LEDs to the sub-scanning-direction cross section, most of the light emitted at an oblique angle to the optical axis is not used as an illuminating light, that is, most of the light is wasted. Therefore, an uneven distribution of brightness occurs in the main-scanning direction unless many LEDs are arranged.

The applicants of the present invention proposed, in a previous application, that is, Japanese Patent No. 3659770, a solution to the problem of the uneven distribution of brightness in the main-scanning direction, but no mention was made of the way how to condense light in the sub-scanning direction. In addition, the applicants of the present invention proposed, in another previous application, that is, Japanese Patent Application Laid-open Publication No. 2004-361425, a structure including, as an optical element, an optical guide that has a light-incoming plane arranged near the light-flux outgoing plane of the point light source, and also has a light-outgoing plane facing the reading area. According to the structure of this disclosure, the targeted distribution of brightness can favorably be obtained. The structure of this disclosure, however, needs reflectors in addition to the optical guide. The resultant complex structure brings about an increase in manufacturing costs.

Then, the applicants of the present invention proposed, in Japanese Patent Application Laid-open Publication No. 2005-278132, an original-document illumination apparatus that can solve all these problems. The original-document illumination apparatus disclosed therein is equipped with a light-source unit and a lengthy lens. The light-source unit has a plurality of rows each of which includes a plurality of LEDs with a certain distribution of luminous intensity. The lengthy lens makes the light emitted from each LED converge not at the position of the original-document within a cross section in the sub-scanning direction but at a position shifted, in the main-scanning direction, from the original-document position by a predetermined distance. The convergence of light in the sub-scanning direction is thus enhanced, so that a higher numerical aperture of the lengthy lens can be accomplished. In addition, the loss of light that may possibly be caused by light diffusion in the main-scanning direction is reduced. Consequently, even a smaller number of LEDs can make uneven distribution of brightness in the main-scanning direction less likely to occur.

The invention disclosed in Japanese Patent Application Laid-open Publication No. 2005-278132 has the above-mentioned advantages, but also has some drawbacks. Assume that the acute convergence of the light at a position on the area of the original-document is combined with a misalignment of illuminating position caused, for example, by an incorrect angle with which the lengthy lens is attached. What may possibly happen in this case is a big change in light quantity that reaches a light detector of a line sensor. This may possibly affect, to a great extent, the image to be formed by the apparatus. Incidentally, the relationship between the brightness or illuminance and the reading position when the illuminance on the original-document area is read along the main-scanning direction can be expressed as an illuminance-distribution curve. For the reason described above, a preferable original-document illumination apparatus for a digital copier or in an image scanner should have an illuminance-distribution curve which is wide, to some extent, in the main-scanning direction, and in which even a deviation of the illuminating center from the reading part will not cause a difference in illuminance within the reading area. To this end, the illuminance-distribution curve should have a flat portion near the point of the maximum illuminance, and the flat portion should have a width larger than a value made by adding a width needed for reading an image and a range of fluctuation caused by mechanical error and the like (for example, a preferable width is 1 mm or larger on each side). In addition, the flat portion should have a section where little unevenness occurs in the distribution of illuminance, that is, a section where the illuminance is substantially constant.

SUMMARY OF THE INVENTION

An object of the present invention is to reduce, even further, the unevenness in the distribution of illuminance intensity in the original-document illumination apparatus that has a liner illuminated area, and thus to improve, even further, the quality in reading original documents and images.

An original-document illumination apparatus according to an embodiment of the present invention, which is made for achieving the above-mentioned objects, includes an illuminated face on which an original-document is placed. The original-document illumination apparatus also includes a light-source unit having a plurality of light-emitting elements which are arranged along the main-scanning direction of the original-document and which illuminate the original-document. The light source unit is movable in a sub-scanning direction that is orthogonal to the main-scanning direction. In addition, the original-document illumination apparatus includes a lens array disposed between the illuminated face and the light-source unit, and having a plurality of convergent lenses. A luminous flux from each of the light-emitting elements of the light-source unit is radiated onto the illuminated face through each of the lenses of the lens array.

In the original-document illumination apparatus, the lenses may be arranged along the main-scanning direction, and each of the light-emitting elements may be disposed so as to correspond to each one of the lenses of the lens array. In addition, each of the light-emitting elements may be a white light emitting diode.

In the original-document illumination apparatus, the lenses may be arranged along the main-scanning direction, and each of the light-emitting elements may be disposed so as to correspond to each one of the lenses of the lens array. In addition, each of the light emitting diodes may be a white light emitting diode which has two or more chips for emitting light of colors different from one another and which emits white light by mixing these colors emitted from the chips.

In the original-document illumination apparatus, the lenses may be arranged along the main-scanning direction, and two or more of the light-emitting elements may be disposed so as to correspond to each one of the lenses of the lens array. In addition, the light-emitting elements may be light emitting diodes that emit light of different colors from one another.

In this case, the light-emitting elements that are disposed so as to correspond to each one of the lenses of the lens array may be a red light emitting diode, a green light emitting diode, and a blue light emitting diode.

In the original-document illumination apparatus, the curvature of each lens of the lens array in a cross section taken along the main-scanning direction may differ from the curvature thereof in a cross section taken along the sub-scanning direction.

In this case, each lens of the lens array may be formed so that at least one of the light-incoming plane and the light-outgoing plane has a non-circular arc shape in the cross-sectional shape of the lens taken along the main-scanning direction and in the cross-sectional shape of the lens taken along the sub-scanning direction.

In the original-document illumination apparatus, at least one of the light-incoming plane and the light-outgoing plane of the lens of the lens array may be a free-form surface.

In the original-document illumination apparatus, the light-incoming plane of each lens of the lens array may be formed so as to have a flat cross-sectional shape taken along the main-scanning direction, and a curved cross-sectional shape taken along the sub-scanning direction with a predetermined curvature. In addition, the light-outgoing plane of each lens may be formed so as to have a cross-sectional shape of the lens taken along the main-scanning direction with a different curvature from the curvature in a cross-sectional shape taken along the sub-scanning direction of the lens.

In the original-document illumination apparatus, the material used in the lens array may be a plastic.

The original-document illumination apparatus according to an example of the present invention may be used in an image reading apparatus.

The original-document illumination apparatus according to an example of the present invention may be used in a color-original-document reading apparatus.

The image reading apparatus may be used in an image forming apparatus.

The color-original-document reading apparatus may be used in an image forming apparatus.

DETAILED DESCRIPTION OF THE PREFERRED EMBODIMENTS

Figure 1:
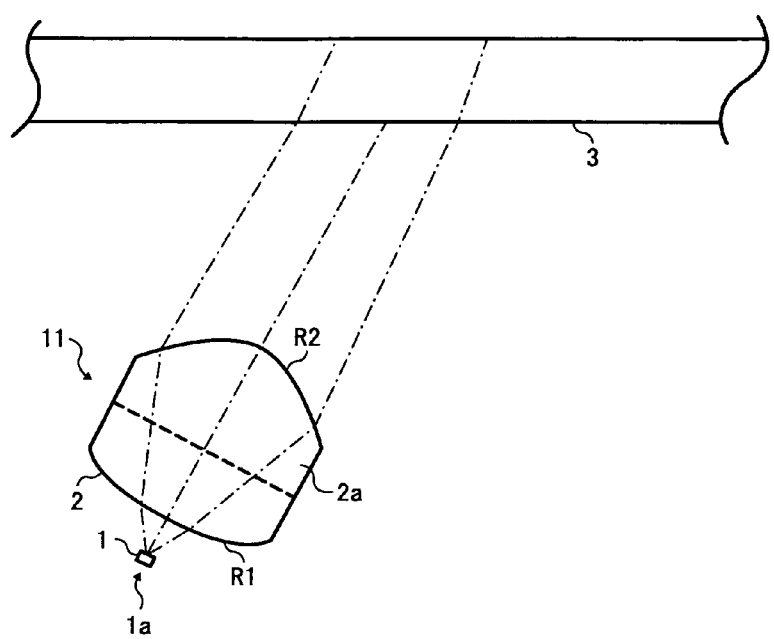
FIG. 1 is a sub-scanning-direction cross-sectional view of an original-document illumination apparatus according to a first embodiment of the present invention. The cross section includes a light source, and shows a configuration of a single lens of a lens array used in Example 1 of the present invention.

Hereinafter, preferred embodiments of the present invention will be described in detail with reference to the accompanying drawings.

First Embodiment

An original-document illumination apparatus according to a first embodiment of the present invention includes a two-dimensional illuminated face that extends in the main-scanning direction and sub-scanning direction. The original-document illumination apparatus also includes a light-source unit. The light-source unit has a plurality of light-emitting elements arranged, at predetermined intervals, in the main-scanning direction, and is movable in the sub-scanning direction. In addition, the original-document illumination apparatus includes a lens array disposed between the illuminated face and the light-source unit. The lens array is formed by arranging a plurality of convergent lenses. The luminous flux emitted from each of the light-emitting elements of the light-source unit is radiated, through the lens array, to the illuminated face.

In the first embodiment, the lenses in the lens array are arranged along the main-scanning direction at predetermined intervals. In addition, the light-emitting elements are arranged so as to correspond, respectively, to the lenses of the lens array. Here, each light-emitting element is preferably a white light emitting diode. In this case, each white light emitting diode may be replaced by two or more light emitting diodes with chips that emit light of different colors from one another. White light can be formed by mixing colors of these light emitting diodes.

In the first embodiment, it is also preferable that, instead of the white light emitting diode as the light-emitting element, a plurality of light emitting diodes that emit light of different colors from one another be used (especially preferable is use of light emitting diodes of red, green and blue).

In the first embodiment, whichever of the above-described forms, the light-emitting elements have, each of the lenses of the lens array has a curvature on the cross section taken along the main-scanning direction which is different from the curvature on the cross-section taken along the sub-scanning direction. In addition, a preferable form of each lens is having at least one of the light-incoming plane and the light-outgoing plane in the cross-sectional view of each lens formed in a non-circular arc. In addition, at least one of the light-incoming plane and the light-outgoing plane may be a free-form surface.

In addition, in the first embodiment, whichever of the above-described forms, the light-emitting element and the lens array respectively have, a preferable raw material for the lens array is a plastic.

The first embodiment of the present invention, which has been described thus far, will be further described in more detail, and in more specificity, using Examples 1 and 2. Before the description of Examples 1 and 2, other preferable embodiments of the present invention will be described, and components of Example 1 or 2 will also be described.

Second Embodiment

An image reading apparatus into which the original-document illumination apparatus according to the first embodiment is incorporated is also a preferred embodiment of the present invention. In addition, a preferable original-document illumination apparatus in the image reading apparatus according to this embodiment is suitable for reading an original-document in color. The image reading apparatus according to this embodiment is an image reading unit 200 in the example shown in FIG. 7.

Third Embodiment

Figure 7:
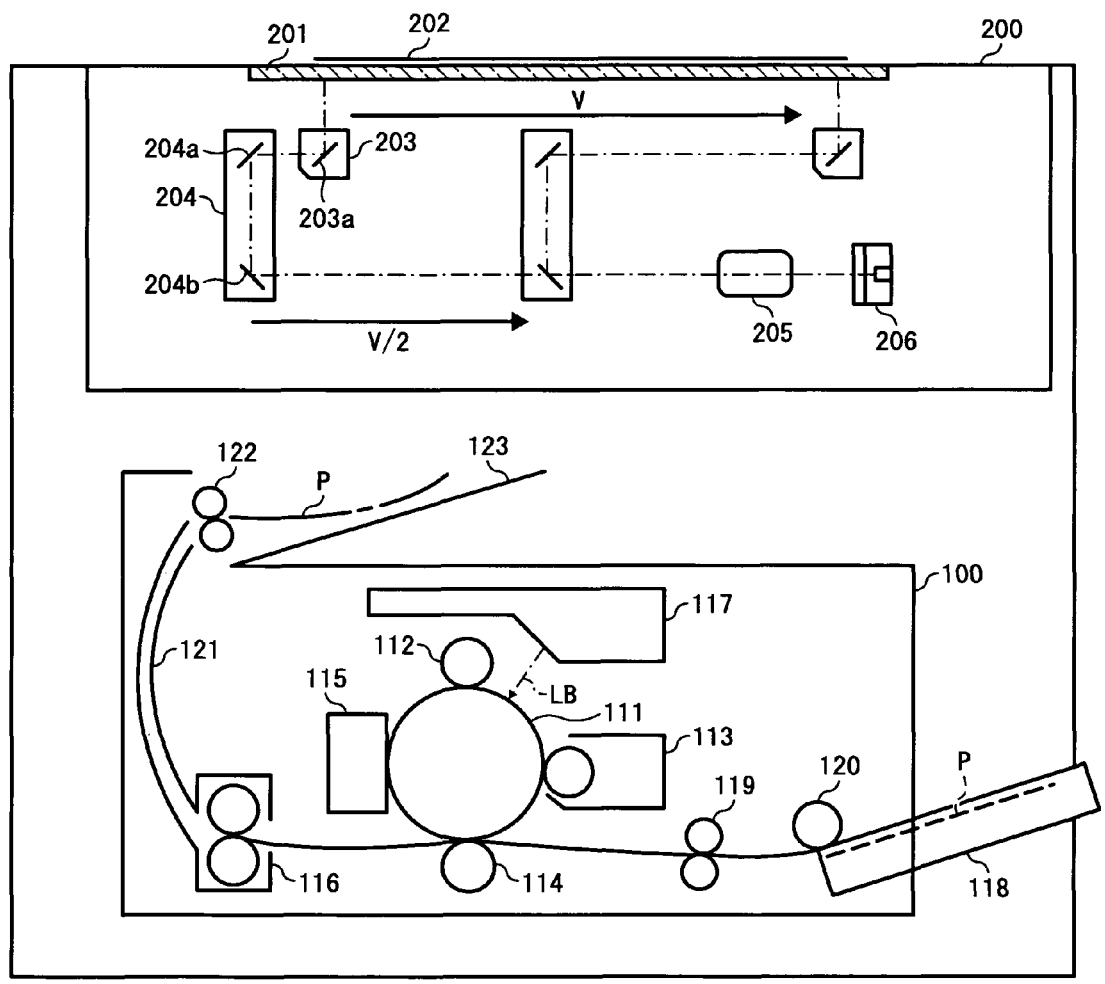
FIG. 7 is a schematic view of an image forming apparatus in which the original-document illumination apparatus according to the first embodiment of the present invention can preferably be used.

An image forming apparatus into which the image reading apparatus according to the second embodiment is incorporated is also a preferred embodiment of the present invention. FIG. 7 shows an example of the image forming apparatus according to this embodiment.

[Components of Examples]

Hereinafter, descriptions will be given of components of Examples 1 and 2 for further specifically describing the first embodiment.

FIG. 1 is a view showing a sub-scanning-direction cross section including a light-emitting element 1 of a light-source unit 1*a*. FIG. 1 shows a single one of a plurality of lenses 2*a* of a lens array 2. Additionally, in the Examples below, each light-emitting element 1 is disposed correspondingly to each lens 2*a*.

In the example shown FIG. 1, the scanning optical system has to optically read the illuminated face, so that the illuminated face—a contact glass 3—is illuminated obliquely from below, and is read form below. Additionally, in FIG. 1, the light emitted from the light-emitting element 1, which is preferably an LED, passes through the lens array 2, and is then radiated onto the contact glass 3.

Note that the configuration shown in FIG. 1 is the same as the configuration of a single one of the lenses 2*a* of the lens array 2 used in Example 1 to be described later.

Figure 2:
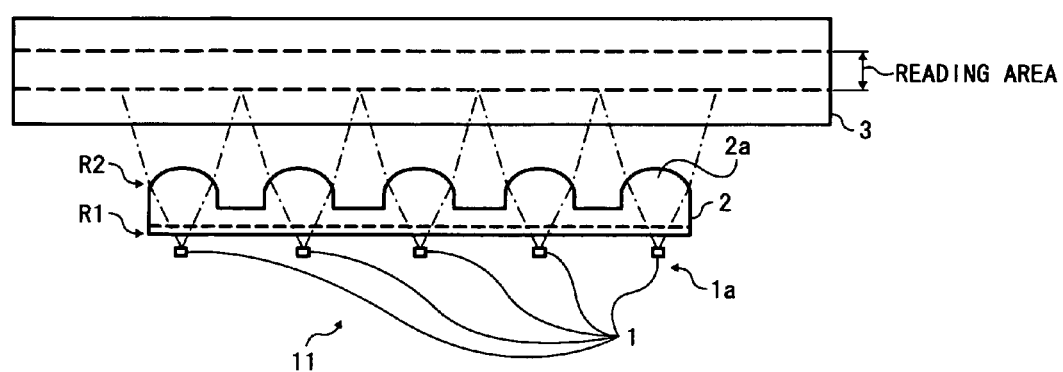
FIG. 2 is a schematic, altered cross-sectional view (a cross-sectional view including a front side view employed in a part thereof for the convenience) of the original-document illumination apparatus according to the first embodiment of the present invention. The cross section is taken along an optical path including the main light beam, and shows a configuration of each lens of the lens array used in Example 1 of the present invention.

FIG. 2 is a schematic diagram showing a cross section taken along an optical path including the main light beam.

In FIG. 2, the part of the drawing showing the contact glass 3 is replaced by a front side view of the contact glass 3. Hereinafter, a drawing of this kind is termed an altered cross-sectional view for the convenience. In FIG. 2, additionally, the light emitted from the light-emitting element 1, which is preferably an LED, passes through the lenses 2*a* of the lens array 2, and is then radiated onto the contact glass 3.

The contact glass 3 is made of a glass plate. In the example shown in FIG. 2, the width of the contact glass 3 in the sub-scanning direction is 20 mm while the length of the contact glass 3 in the main-scanning direction is 50 mm. Within the entire area of the contact glass 3, areas that are respectively opposite each of the light-emitting elements 1 of the light-source unit 1*a* serve as the reading area. In the example shown in FIG. 2, the width of the reading area in the sub-scanning direction is approximately 2 mm. In the case of a tri-color CCD, the width of the CCD as reading means in the sub-scanning direction is approximately 1 mm when converted into a position on the illuminated area. The above-mentioned width of the reading area is set at 2 mm because the width of illumination needs to tolerate manufacturing error and assembling error of the components, and the like. Accordingly, a high-quality image can be obtained as long as the uneven distribution of illuminance that occurs in the reading area is within a tolerable range.

Here, the uneven distribution of brightness or illuminance is the ratio, expressed in percentage, of difference between the maximum illuminance and the minimum illuminance to the maximum illuminance. A preferable value of tolerance for the uneven distribution of illuminance is not more than 12% in the case of reading a color image, and approximately 30% in the case of reading a monochrome image.

The main light beam is a light beam passing through the optical axis of the lens 2*a*. Ordinarily, the radiating direction that yields the maximum energy of light emitted from a light source is made exactly to be the direction of the optical axis of the lens 2*a*. Consequently, the main light beam should have the maximum light energy.

Figure 3:
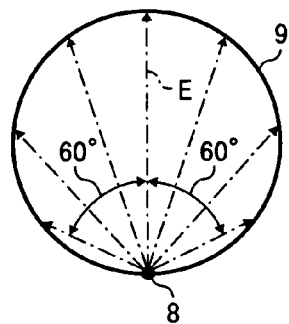
FIG. 3 shows an example of the distribution of luminous intensity of the point light source of the original-document illumination apparatus according to the first embodiment of the present invention. The distribution of luminous intensity of the example is Lambert distribution.

FIG. 3 shows the distribution of luminous intensity 9 of point light source 8.

In the example shown in FIG. 3, the distribution of luminous intensity 9 of the point light source 8 is a Lambert distribution. Specifically, the intensity of light energy radiated from the point light source 8 is spherically distributed. FIG. 3 shows a cross-sectional diagram of the distribution of light-energy intensity of the point light source 8. In the case of this distribution, among the light radiated from the light source 8, the light emitted in a direction normal to the outgoing surface of the light source 8 has the maximum light-energy intensity. Now, the direction in which a maximum energy E is radiated is defined as $\theta=0°$. Then, as the value $\theta$ increases, the intensity of light energy radiated to the angular direction decreases. For example, the intensity of light energy at $\theta=60°$ is half the maximum value (at half maximum). When the radiation is considered in solid-angle terms, the intensity of light energy at $\theta=60°$ is a quarter the maximum value.

Now, descriptions will be given of the light source which can be used in the present invention.

The most suitable light source for the present invention is a light emitting diode (LED) 1. In particular, it is preferable to employ a white LED as the light source in order to deal with any type of original-document to read.

There are various types of white LEDs. One of these various types of white LEDs is a single-chip type white LED using a phosphor. The single-chip type white LED is made by encapsulating a light-emitting member, i.e., chip, in a transparent encapsulating member, into which YAG phosphor is mixed. The chip is made of InGaN, and emits blue light. With this configuration, while the chip emits blue light, the phosphor is excited to emit yellow light. Since blue and yellow are complimentary, the light of blue and that of yellow, when emitted out together, produce the light of a white color.

Another type of white LEDs uses no phosphor. Instead, the type of white light emitting diode uses two or more chips each of which emits light of a different color from others. The colors from these chips are mixed to form the white light. These chips are arranged on a single plane, and are combined so that light of colors emitted from all the chips are mixed to form the light of the white color.

For example, in the case of using two chips, a chip emitting blue light and another chip emitting yellow light are used as in the above-described case. In the case of using three chips, chips emitting colors of red, green, and blue, a.k.a. three primary colors, are used.

Three cases of different LED usage have just been described. Used in a first case is a white LED that has a chip emitting light of white color. Used in the second case is a white LED in which a plurality of different colors emitted from respective chips are mixed to form the light of white color. In the third case, a plurality of LEDs emitting different colors, such as a blue LED and a yellow LED, are used, and are combined to form the light of white color. In every above-described case, the same effect can be obtained. Specifically, the reading apparatus is thus capable of handling any type of original-document including an original-document in color.

Example 1

Shown below is the specification of this Example 1.
<Each Lens within the Lens Array>
  Light-Incoming Plane R1:
  Main-scanning-direction cross section is a flat surface.
  Sub-scanning-direction cross section has a curvature radius R=10 (mm).
  Light-Outgoing Plane R2:
  Main-scanning-direction cross section has a curvature radius R=5.925 (mm), and a conical coefficient K=−0.888.
  sub-scanning-direction cross section has a curvature radius R=3.193 (mm), a conical coefficient K=−0.885, and an aspherical coefficient for fourth order $A_4$=0.00076.

It should be noted that the plane R2 is aspherical both in the main-scanning-direction cross section and in the sub-scanning-direction cross section. When C is the inverse of the paraxial curvature radius (paraxial curvature) and H is the height from the optical axis, the aspherical shape of the lens 2a is defined by the following formula (Formula 1).

$$X = \frac{CH^2}{1+\sqrt{1-(1+K)C^2H^2}} + A_4H^4 + A_6H^6 + A_8H^8 + A_{10} \quad \text{[Formula 1]}$$

Thickness at the center: 7.73
  Shape of lens: Lens 2a is a rectangular lens, has an 8-mm dimension along the main-scanning direction, and 8-mm dimension along the sub-scanning direction.
  Material: nd=1.491 and vd=57.2
<LED>
  Distribution of luminous intensity: Lambert distribution.
  Intensity distribution on the light-emitting plane: Uniform.
  Dimensions of light-emitting plane: 0.3 (mm)×0.3 (mm)
  Number of LEDs: 5
  Efficiency: 1(W)×5
  Wavelength of emitted light: White light composed of the following three spectra, each with a weight shown as follows:
    450 nm: weight 1
    550 nm: weight 1
    650 nm: weight 1
<Contact Glass>
  Thickness at the center: 3.2 (mm)
  Material: nd=1.517 and vd=64.2

<Positional Relationships>
  (On the optical axis of the lens) Distance from the plane R1 of the lens 2a to the LED: 1.81 (mm)
  (On the optical axis of the lens) Distance from the plane R2 of the lens 2a to the contact glass 3: 9.81 (mm)
  Inclination of the contact glass 3 to the optical axis of the lens 2a: 28.6°
<Illuminated Face (Plane of Original-Document)>
  The illuminated face is on the plane of contact glass 3. The width of the illuminated face is 20 mm, and the length of the illuminated face is 50 mm.

Figure 4:
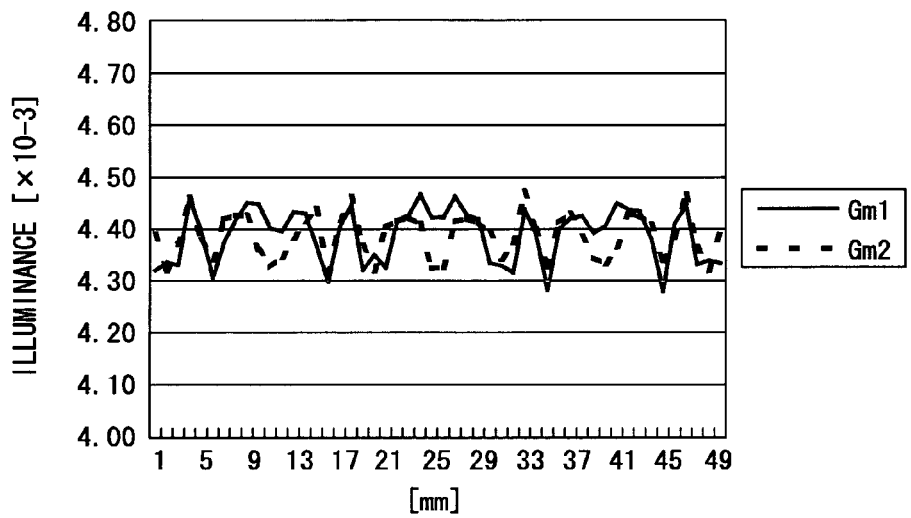
FIG. 4 is a chart for describing the distribution of illuminance in the main-scanning direction of the original-document illumination apparatus according to Example 1 of the present invention.

FIG. 4 is a chart for describing the distribution of illuminance in the main-scanning direction according to this Example 1.

The surface of the contact glass 3 is divided into a mesh shape composed of a plurality of areas each of which is a 1 (mm)×1 (mm) square. FIG. 4 shows the illuminance corresponding to each of the areas arranged along the main-scanning direction among the above-described areas of contact glass 3. The illuminance of each area is defined by the number of light beams that enter the area.

Assume that a central area of illumination is defined as the position of the highest illuminance when viewed along the main-scanning direction in the approximate center of the illuminating width along the sub-scanning direction. The curved lines Gm1 and Gm2 represent respectively a distribution of illuminance in the main-scanning direction on the above assumption. Each of the curved lines Gm1 and Gm2 shows the illuminance of an area with a 1-mm width in the sub-scanning direction. Accordingly, with reference to these two curved lines, the state of illuminance within a reading area of a 2-mm width can be understood.

In each of the areas where the curved lines Gm1 and Gm2 are respectively measured, the ratio of the minimum illuminance to the maximum illuminance is 95.7%. The unevenness in the illuminance distribution is obtained by converting the above-mentioned value, and the value of the unevenness in the illuminance distribution is 4.3%. Incidentally, the tolerable value of the unevenness in the illuminance distribution in the case of reading an original-document in color is approximately 12%. As seen from above, the 2-mm reading area can be secured in this Example 1.

Figure 5:
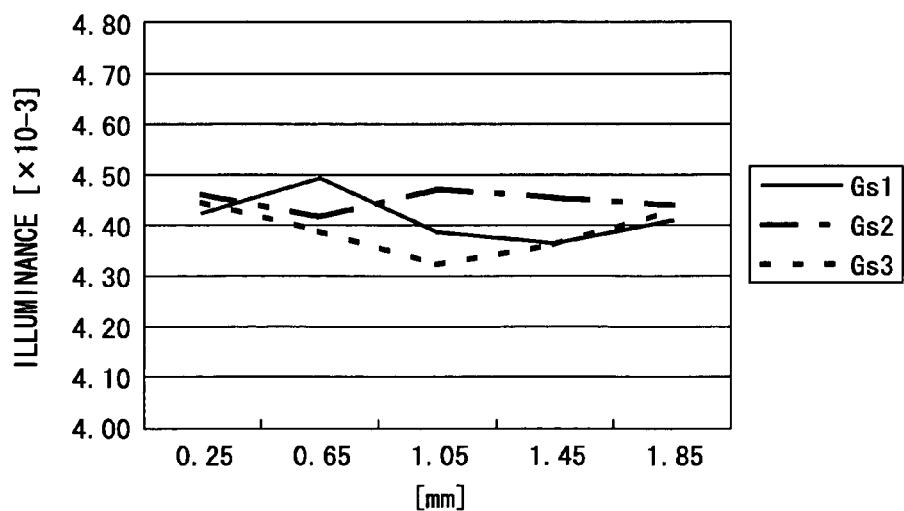
FIG. 5 is a chart for describing the distribution of illuminance in the sub-scanning direction of the original-document illumination apparatus according to Example 1 of the present invention.

FIG. 5 is a chart for describing the distribution of illuminance in the sub-scanning direction according to this Example 1.

The surface of the contact glass 3 is divided into a mesh shape composed of a plurality of areas. Now, each of the areas has a 1-mm dimension in the main-scanning direction and 0.4-mm dimension in the sub-scanning direction. FIG. 5 shows the illuminance corresponding to each of the areas arranged along the sub-scanning direction among the above-described areas of contact glass 3. The illuminance of each area is defined by the number of light beams that enter the area.

The curved line Gs1 shows the distribution of illuminance along the sub-scanning direction at the central position in the main-scanning direction. The curved lines Gs2 shows the distribution of illuminance along the sub-scanning direction at a position away from the central position towards an end in the main-scanning direction by 3.6 mm. The curved lines Gs3 shows the distribution of illuminance at a position away from the central position by another 3.6 mm (away from the central position by 7.2 mm). Incidentally, the lenses 2a, and also the LEDs 1, are arranged at a pitch of 14.5 mm. Then, similarly in the distribution of illuminance, a substantially identical shape of distribution pattern repeatedly appears every 14.5 mm. By observing the areas within a region between the central position and the position away from the central position in the main-scanning direction by 7.2 mm, the distribution of illuminance for approximately the entire reading area can be estimated. It should be noted that the estimation is possible on condition that the distribution of illuminance is steady all the way between the two ends in the main-scanning direction. The unevenness in the illuminance distribution within the above-mentioned region of 7.2-mm width is less than 3.8%. The graph indicates that areas of 50 (mm)×2 (mm) show a uniform illuminance, and that these areas can be used for the reading area.

Example 2

Shown below is the specification of this Example 2.
<Each Lens within the Lens Array>
It is the same as Example 1.
<LED>
Distribution of luminous intensity: Lambert distribution
Intensity distribution on the light-emitting plane: Uniform
Dimensions of light-emitting plane: 0.3 (mm)×0.3 (mm)
Number of LEDs: 15
5 LEDs of emitted light of a 450-nm wavelength;
5 LEDs of emitted light of a 550-nm wavelength; and
5 LEDs of emitted light of a 650-nm wavelength
Efficiency: 1(W)×15
<Contact Glass>
It is the same as Example 1.

Figure 6:
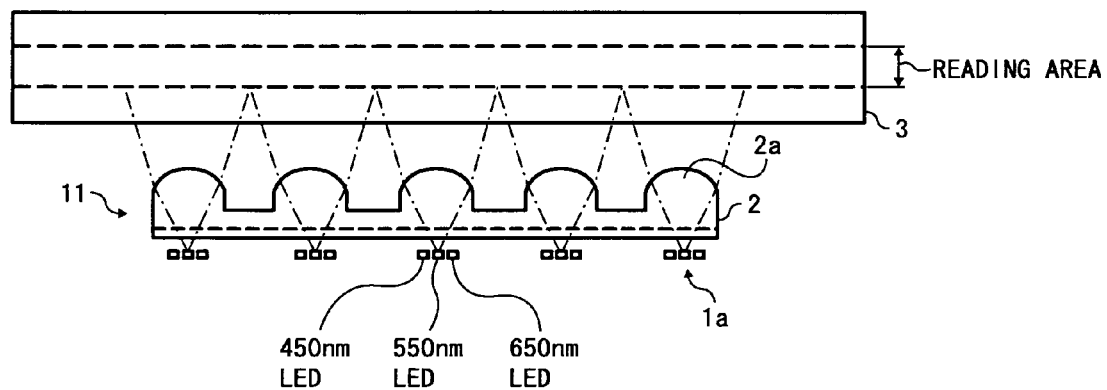
FIG. 6 is an altered cross-sectional view (a cross-sectional view including a plan view employed in a part thereof for the convenience) of an original-document illumination apparatus according to Example 2 of the present invention.

FIG. 6 is an altered cross-sectional view according to Example 2.

Used in Example 2 is the same lens array 2 as the one used in Example 1. In the example shown in FIG. 6, LEDs of emitted light of a 450-nm wavelength, LEDs of emitted light of a 550-nm wavelength, LEDs of emitted light of a 650-nm wavelength, are arranged in the main-scanning direction at predetermined intervals while one for each kind of LEDs are made to correspond to each lens 2a of the lens array 2. In the example shown in FIG. 6, the three LEDs 1 corresponding to each lens 2a are arranged at 0.5-mm intervals.

With this configuration, a higher illuminance on the original-document plane can be accomplished. In addition, the light energy emitted from each LED 1 is adjustable. As a result, an optimal emitted-light spectrum can be formed for the reading lens 2a, the CCD and the image processing apparatus that are compatible to the original-document illumination apparatus 11.

According to the present invention, the original-document illumination apparatus 11 with a linear illuminated area can have an even smaller unevenness in the illuminance distribution than that of a conventional original-document illumination apparatus. As a result, an improved quality of reading an original-document and an image can be achieved.

Although the present invention has been described in terms of exemplary embodiments, it is not limited thereto. It should be appreciated that variations may be made in the embodiments described by persona skilled in the art without departing from the scope of the present invention as defined by the following claims.

What is claimed is:

1. An original-document illumination apparatus comprising:
an illuminated face on which an original-document is placed;
a light-source unit which includes a plurality of light-emitting elements, arranged in the main-scanning direction of the original-document, is configured to illuminate the original-document, and capable of moving in the sub-scanning direction orthogonal to the main-scanning direction; and
a lens array which is disposed between the illuminated face and the light-source unit and has a plurality of convergent lenses,
wherein a luminous flux from each of the light-emitting elements of the light-source unit is radiated onto the illuminated face through the corresponding one of the lenses of the lens array,
wherein each of the plurality of convergent lenses includes a light-incoming plane in which the luminous flux from each of the light-emitting elements is introduced and a light-outgoing plane emitting light from which the introduced luminous flux is emitted,
wherein the light-incoming plane of each lens of the lens array is formed so as to have a flat cross-section shape taken along the main-scanning direction, and a curved cross-sectional shape taken along the sub-scanning direction with a predetermined curvature, and
the light-outgoing plane of each lens is formed so as to have a cross-sectional shape of the lens taken along the main-scanning direction with a different curvature from the curvature in a cross-sectional shape taken along the sub-scanning direction of the lens.

2. The original-document illumination apparatus according to claim 1, wherein the lenses are arranged along the main-scanning direction, each of the light-emitting elements is disposed so as to correspond to each one of the lenses of the lens array, and each of the light-emitting elements is a white light emitting diode.

3. The original-document illumination apparatus according to claim 1, wherein the lenses are arranged along the main-scanning direction, each of the light-emitting elements is disposed so as to correspond to each one of the lenses of the lens array, each of the light emitting diodes is a white light emitting diode which has two or more chips for emitting light of colors different from one another, and which emits white light by mixing these colors emitted from the chips.

4. The original-document illumination apparatus according to claim 1, wherein the lenses are arranged along the main-scanning direction, two or more of the light-emitting elements are disposed so as to correspond to each one of the lenses of the lens array, and, the light-emitting elements are light emitting diodes that emit light of different colors from one another.

5. The original-document illumination apparatus according to claim 4, wherein the light-emitting elements that are disposed so as to correspond to each one of the lenses of the lens array are a red light emitting diode, a green light emitting diode, and a blue light emitting diode.

6. The original-document illumination apparatus according to claim 1, wherein the curvature of each lens of the lens array in a cross section taken along the main-scanning direction differs from the curvature thereof in a cross section taken along the sub-scanning direction.

7. The original-document illumination apparatus according to claim 6, wherein each lens of the lens array is formed so that at least one of the light-incoming plane and the light-outgoing plane has a non-circular arc shape in the cross-sectional shape of the lens taken along the main-scanning direction and in the cross-sectional shape of the lens taken along the sub-scanning direction.

8. The original-document illumination apparatus according to claim 1, wherein at least one of the light-incoming plane and the light-outgoing plane of the lens of the lens array is a free-form surface.

9. The original-document illumination apparatus according to claim 1, wherein the material used in the lens array is a plastic.

10. An image reading apparatus comprising the original-document illumination apparatus according to claim 1.

11. A color-original-document reading apparatus comprising the original-document illumination apparatus according to claim 1.

12. An image forming apparatus comprising the image reading apparatus according to claim 10.

13. An image forming apparatus comprising the color-original-document reading apparatus according to claim 11.

* * * * *